United States Patent [19]
Stetson, Jr. et al.

[11] Patent Number: 5,729,234
[45] Date of Patent: Mar. 17, 1998

[54] REMOTE ALIGNMENT SYSTEM

[75] Inventors: John Batterson Stetson, Jr., New Hope, Pa.; Randall Deen Morris, Medford; Naresh Raman Patel, Bellmawr, both of N.J.

[73] Assignee: Lockheed Martin Corp., Moorestown, N.J.

[21] Appl. No.: 717,962

[22] Filed: Sep. 23, 1996

[51] Int. Cl.$^6$ ........................................... G01S 13/46
[52] U.S. Cl. ................ 342/62; 342/63; 342/139; 342/140; 342/146; 342/463
[58] Field of Search ................... 342/59, 125, 126, 342/139, 140, 146, 147, 463, 62, 63

[56] References Cited

U.S. PATENT DOCUMENTS

| | | | |
|---|---|---|---|
| 3,691,560 | 9/1972 | Hammack | 342/387 |
| 3,866,229 | 2/1975 | Hammack | 342/451 |
| 3,952,308 | 4/1976 | Lammers | 342/410 |
| 3,996,590 | 12/1976 | Hammack | 342/456 |
| 4,060,809 | 11/1977 | Baghdady | 342/451 |
| 4,649,390 | 3/1987 | Andrews et al. | 342/140 |
| 4,737,794 | 4/1988 | Jones | 342/448 |
| 5,150,310 | 9/1992 | Greenspun et al. | 364/516 |
| 5,177,489 | 1/1993 | Hatch | 342/357 |

*Primary Examiner*—John B. Sotomayor
*Attorney, Agent, or Firm*—W. H. Meise; S. D. Weinstein; S. A. Young

[57] ABSTRACT

An arrangement for coordinating positional and angle information made on separate relatively moving platforms, such as aircraft, having independent coordinate systems, uses measurements of a common reference made on both platforms. The measurements are transmitted to a common location. Measurements made at a first time are processed to determine two of three coordinate transformation angles. After a period of time, a second set of measurements is used to determine the third coordinate transformation angle. In a particular embodiment of the invention, the direction of motion of one of the platforms is controlled to be orthogonal to a coordinate axis of the other platform. When the coordinate transformation is determined, it can be used to coordinate or align navigation instruments, weapons, or the like. In one embodiment of the invention, a missile is directed toward a target, in a situation in which the target is viewed from the missile and another moving vehicle.

3 Claims, 7 Drawing Sheets

Fig. 8a  $\sim 302^*(t) = \begin{bmatrix} 0 & 302^*(t,z) & -302^*(t,y) \\ -302^*(t,z) & 0 & 302^*(t,x) \\ 302^*(t,y) & -302^*(t,x) & 0 \end{bmatrix}$ Fig. 8b  $\sim 302^*(t+1) = \begin{bmatrix} 0 & 302^*(t+1,z) & -302^*(t+1,y) \\ -302^*(t+1,z) & 0 & 302^*(t+1,x) \\ 302^*(t+1,y) & -302^*(t+1,x) & 0 \end{bmatrix}$ Fig. 8c  $302^{*A} = \begin{bmatrix} \sim 302^*(t) \\ \sim 302^*(t+1) \end{bmatrix}$ Fig. 8d  $302^U = \begin{bmatrix} 302(t,x) \\ 302(t,y) \\ 302(t,z) \\ 302(t+1,x) \\ 302(t+1,y) \\ 302(t+1,z) \end{bmatrix}$ Fig. 8e $\quad 302*^{PA} = \left\{\left[302^A\right]^T 302^A\right\}^{-1} \left[302**^A\right]^T$ Fig. 8f $\quad c = \begin{bmatrix} e_x \\ e_y \\ e_z \end{bmatrix} = \begin{bmatrix} \theta \\ \psi \\ \phi \end{bmatrix} = 302*^{PA} \cdot 302^U$ Fig. 9a $\quad [c] = \begin{bmatrix} 1 & -e_z & e_y \\ e_z & 1 & -e_x \\ -e_y & e_x & 1 \end{bmatrix}$ Fig. 9b $\quad \begin{bmatrix} x \\ y \\ z \end{bmatrix} = [c] \begin{bmatrix} r \\ s \\ t \end{bmatrix}$

REMOTE ALIGNMENT SYSTEM

FIELD OF THE INVENTION

This invention relates to determining the position and attitude of objects moving relative to each other, and, more particularly, to missile guidance, aircraft navigation and traffic control, terrestrial transportation and guidance, and the like.

BACKGROUND OF THE INVENTION

The processes which are ordinarily used to precisely align two (or more) remotely located objects, such as radar installations, or inertial sensor reference frames, such as may occur on moving aircraft or missiles, are typically achieved by cumbersome calibration. Over time, and in response to normal environmental conditions, system alignment knowledge may be degraded as a result of uncompensated motion.

In the presence of certain combinations of motion, whether that motion is rapid or slow, it may be not be possible to determine how the an object reference frame has rotated relative to the reference frame of another object. Existing calibration methods may require optical or radio frequency hardware, which may decrease reliability, and may be restricted to obtaining only the alignment angles perpendicular to the object's boresight or line of sight. Rotational orientation of a remote object may not be observable from the observation location. Large errors in the rotation between the lines-of-sight extending between the separate coordinate systems of two objects may contribute to erroneous position determinations.

Improved methods for position and/or attitude determination are desired.

SUMMARY OF THE INVENTION

An apparatus according to the invention determines the attitude of an object moving relative to another object, based upon first and second position measurements made at the objects. The apparatus is associated with a first object having a first coordinate system including mutually orthogonal x, y, and z coordinate axes, and is also associated with a second object, remote from the first object, which may be in compound motion relative thereto. The second object has a second coordinate system including its own mutually orthogonal r, s, and t coordinate axes. The r, s, and t axes may not correspond rotationally with the x, y, and z axes of the first coordinate system. A position signal generator is coupled to the first and second objects, and to a reference object remote from the first and second objects. The position signal generator generates, at a first instant of time, first and second position signals representative of the position of the reference object relative to the first and second objects, respectively, and a third position signal representative of the position of the second object relative to the first object. The signal generator also generates, at a second instant of time, fourth and fifth position signals representative of the position of the reference object relative to the first and second objects, respectively, and a sixth position signal representative of the position of the second object relative to the first object. At the second instant of time, the second object is at a different position relative to the first object than at the first instant. The first, third, fourth and sixth position signals are measured in the first coordinate system, and the second and fifth position signals are measured in the second coordinate system. A processor is coupled to the position signal generator for estimating the position of the second object relative to the reference object based upon the first and third reference signals, and for comparing the estimate of the position of the second object relative to the reference object with the second position signal for generating first and second angles of a three-angle transformation matrix representative of the attitude of the second coordinate system relative to the first coordinate system. The processor also estimates the third angle of the transformation matrix from the fourth, fifth, and sixth position signals. In one embodiment, the relative motions of the first and second objects may be controlled by signals based upon the application of the transformation matrix to the position signals measured at both of the objects.

In a particular embodiment of the invention, remote control of flying vehicle is contemplated, for guiding it toward a target viewed from a second vehicle.

BRIEF DESCRIPTION OF THE DRAWINGS

FIGS. 8a, 8b, 8c, 8d, 8e, and 8f are equations which are used to determine the coordinate transformation matrix between the coordinate systems of FIG. 1; and FIGS. 9a and 9b are matrix equations representing the transformation between coordinate systems of FIG. 1.

DESCRIPTION OF THE INVENTION

Figure 1:
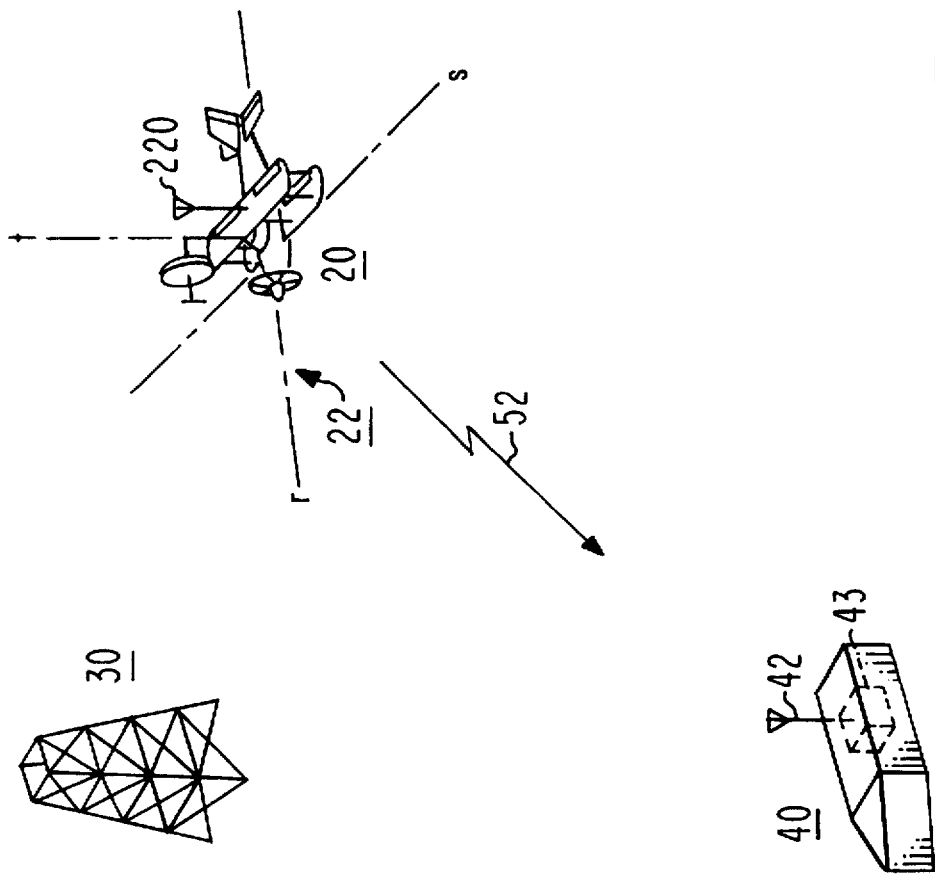
FIG. 1 is a simplified diagram illustrating two aircraft in flight, each viewing each other and a reference object by means of radar, and each transmitting signals representing their observations to a ground station.

In FIG. 1, a first aircraft 10 is in motion, and is associated with a first x, y, and z coordinate system designated generally as 12. Aircraft 10 includes a radar system, the antenna of which is designated as 14, with which aircraft 10 observes its surroundings, which include a fixed terrestrial tower 30. Similarly, a second moving aircraft 20 is associated with a second r, s, and t coordinate system designated generally as 22, with which aircraft 20 observes its surroundings, also including terrestrial tower 30. Aircraft 10 and 20 generate signals which represent tower 30 and the other aircraft positions as seen in their coordinate systems 12 and 22, respectively, and transmit those signals by means of antennas designated 220 to a common location at which processing of the information may be performed. As illustrated in FIG. 1, the common location is a processor 43 in a building designated generally as 40, which includes an antenna 42 for receiving position signals transmitted from aircraft 10 and 20 over signal paths 50 and 52, respectively. The common location for processing could be on aircraft 10 or on aircraft 20, or anywhere else that position signals are available.

Figure 2:
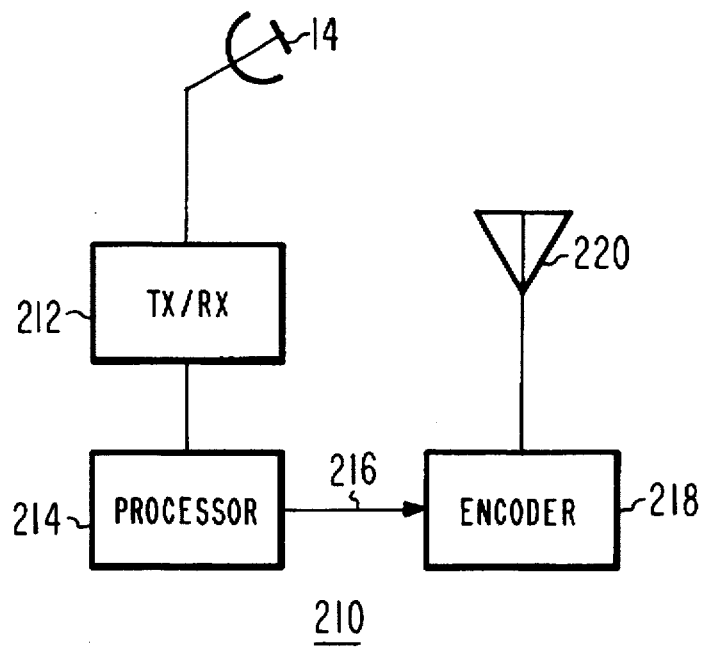
FIG. 2 is a representation of the position determining equipment located on one of the aircraft of FIG. 1, for generating position-representative signals.

FIG. 2 represents the signal generating arrangement on one of the aircraft of FIG. 1. For definiteness, the processing equipment of aircraft 10, is shown. The equipment on aircraft 20 is similar. In FIG. 2, antenna 14 transmits and receives radar signals in known fashion with the aid of a transmitter-receiver (TX/RX) 212. The resulting signals represent the environment around aircraft 10 relative to the x, y and z axes of coordinate system 12. Processor 214 processes the signals as described below to produce signals representative of the positions of tower 30, and of the other aircraft (aircraft 20 in the case of FIG. 2). The signals representative of the positions are applied over a path 216 to an encoder or transmitter illustrated as a block 218, which transmits the signal by way of antenna 220.

Figure 3:
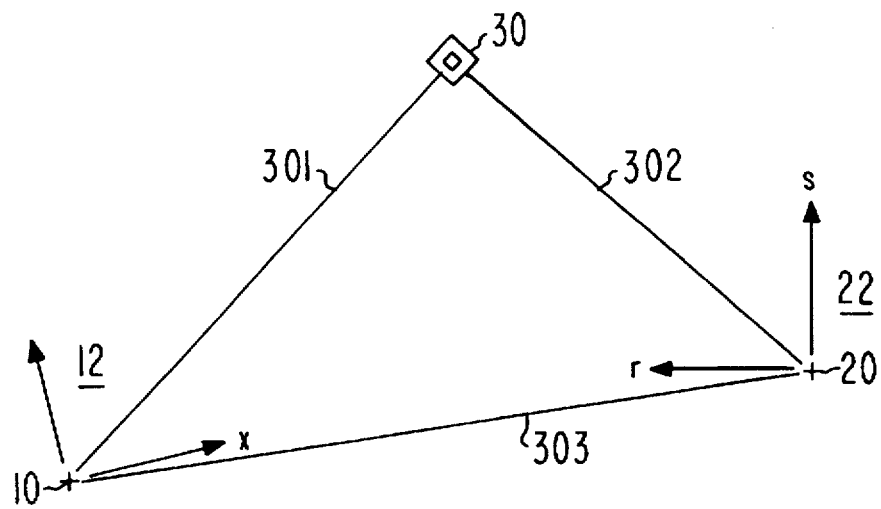
FIG. 3 is a diagram representing the distances and angles between objects which can be measured at each aircraft of FIG. 1 by means of the equipment of FIG. 2.

FIG. 3 illustrates the relative positions of aircraft 10 and 20 and of tower 30 as they might appear on a display, together with coordinate systems. A line 301 interconnects the aircraft 10, at the origin of coordinate system 12, with object 30, taken as a reference object. A similar line 302 connects aircraft 20 at the origin of coordinate system 22 with object 30. A third line 303 connects the origins of coordinate systems 12 and 22, and represents the one of the aircraft as seen from the other. Each of lines 301, 302, and 303 represents a vector quantity, meaning that it represents both the magnitude (distance) and direction (angle) between the associated objects. The magnitude is determined by the radar range, and the angle is determined by the position of the antenna relative to the local coordinate system. Thus, aircraft 10 is spaced apart from tower 30 by a distance and angle which are represented by the length and angular position of line 301. Similarly, aircraft 20 is spaced apart from tower 30 by a distance and angle which are represented by the length and angular position, respectively, of line 302. Aircraft 10 is spaced apart from aircraft 20 by a distance and angle which are represented by the length and angular position, respectively, of line 303. It will be understood that the directions and distances illustrated in FIG. 3 can only be illustrated in two dimensions, but actually represent three dimensional quantities. It will be noted that the coordinate systems 12 and 22 of FIG. 3 do not have parallel axes, in that the x axis is not parallel to the r axis, and therefore the y axis is not parallel to the s axis. Those skilled in the art will understand that coordinate system 12 may also be rotated about the x axis so that the y and s axes do not lie in the same plane. As a result, coordinate system 12 may be skewed in all three axes relative to coordinate system 22. The position-representative signals traversing signal path 216 of FIG. 2 represent vectors 301, 302 and 303 of FIG. 3. The processing performed in the processor 214 of FIG. 2 to generate information representing vectors 301, 302, and 303 is very simple, and should be apparent to those skilled in the art.

Figure 4A:
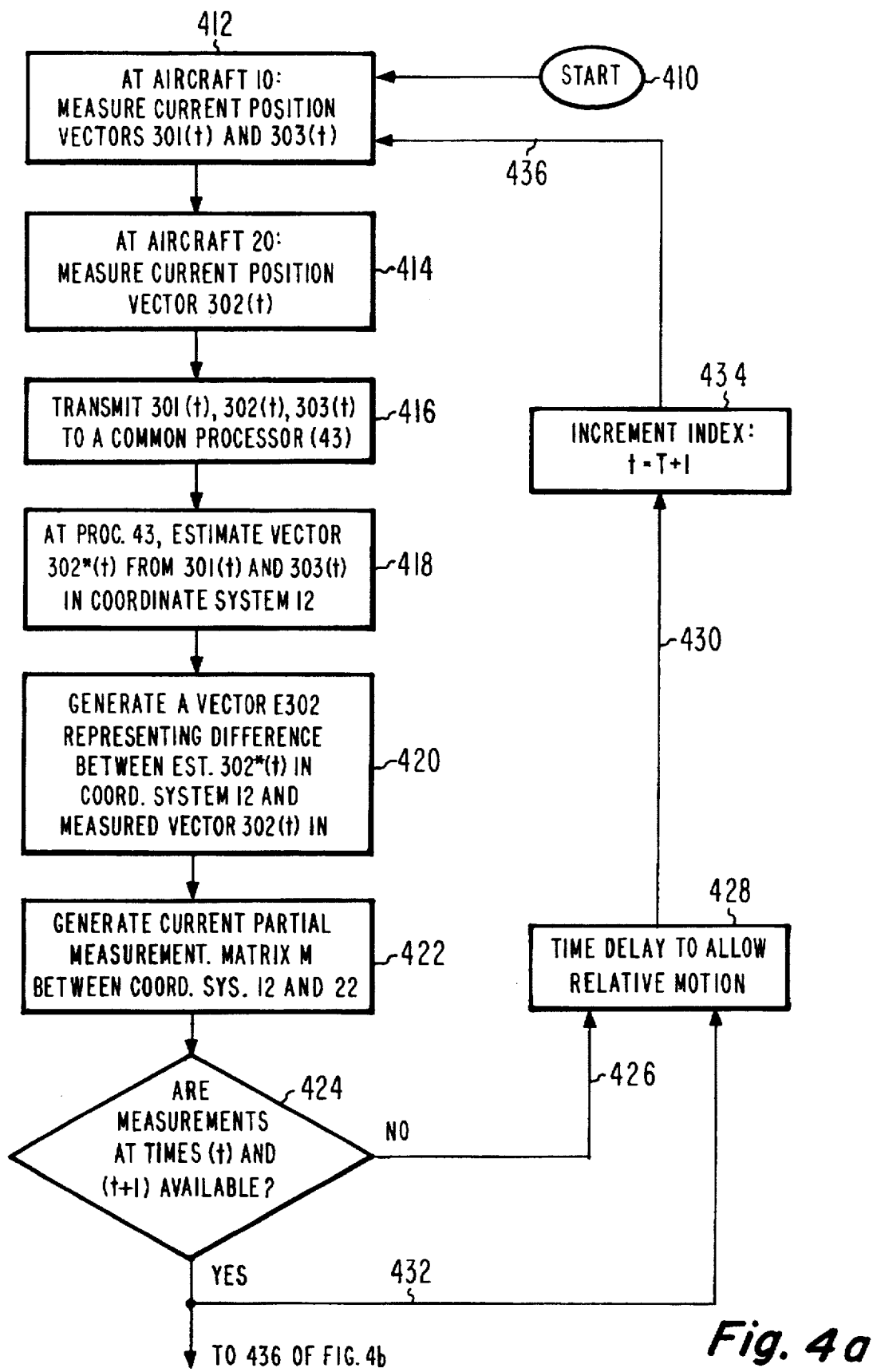
FIGS. 4a and 4b together represent a flow chart of the process which is performed at some arbitrary location in response to the position-representative signals of FIG. 3 produced by the aircraft of FIG. 1.
Figure 4B:
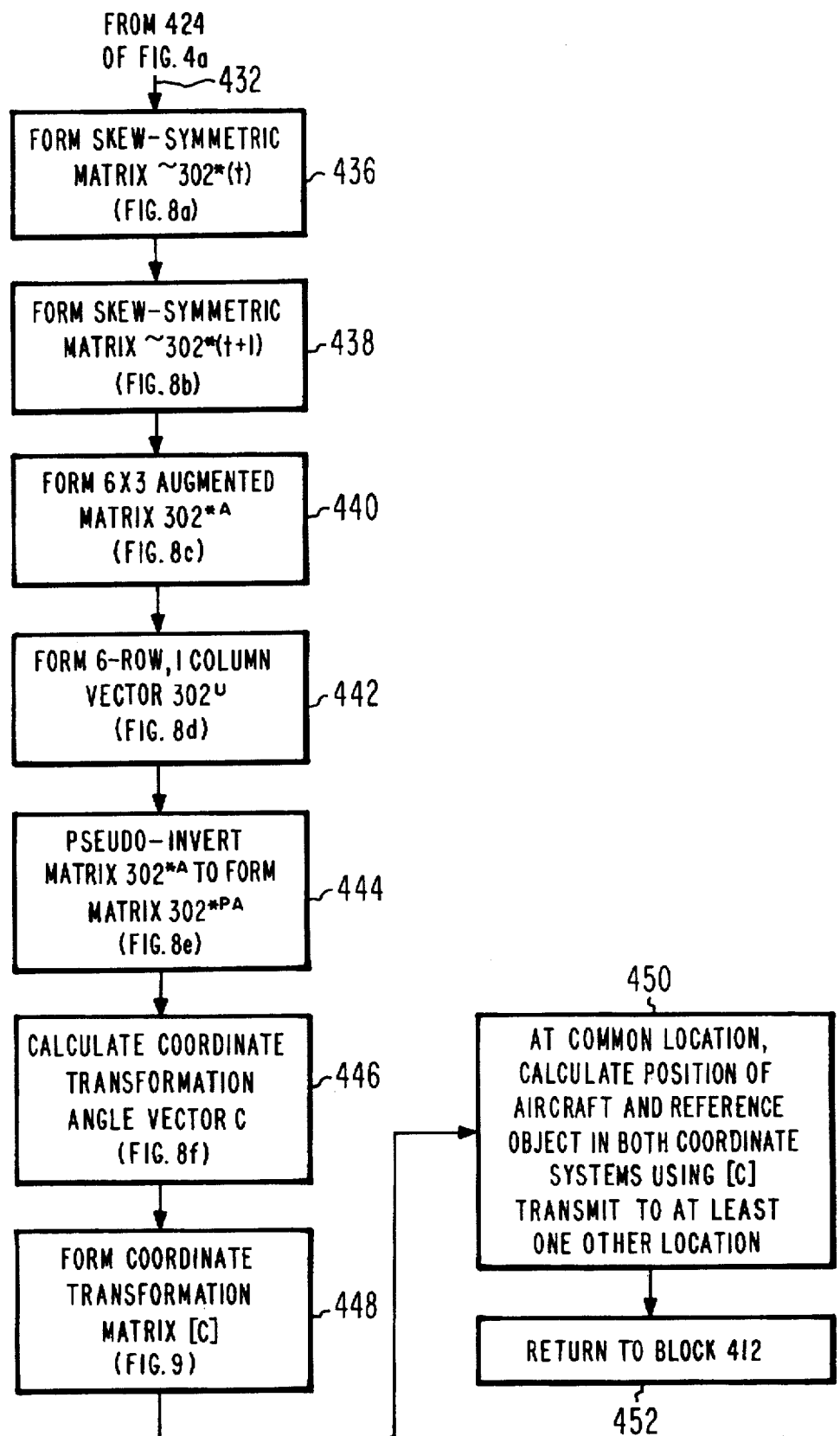

FIGS. 4a and 4b together represent a simplified flowchart illustrating the processing which is performed by processor 43, that receives the position-representative signals 301, 302, and 303 by way of antenna 42 of FIG. 1.

In FIG. 4a, the logic starts at START node 410, and proceeds to a block 412, which represents the determination or measurement of the magnitude and angle of the current value of position vectors 301 and 303 of FIG. 3 relative to the aircraft's own coordinate system 12. For definiteness, these two vectors are designated 301(t) and 303(t). The (t) represents measurements made at time t. The logic flows from block 412 to block 414, which represents the current measurement performed by aircraft 20 in its coordinate system 22. For consistency of designation, vector 302 as so measured is designated 302(t). Thus, all of the position vector measurements at or about time t are available, but at different locations. More particularly, vectors 301(t) and 303(t) are available at aircraft 10, while vector 302(t) is available at aircraft 20.

From block 414 of FIG. 4a, the logic proceeds to a further block 416, which suggests the transmission of position vectors 301(t), 302(t) and 303(t) to a common location, at which they may be processed together. As illustrated in FIG. 1, the information from aircraft 10 and 20 is transmitted by way of paths 50 and 52, and an antenna 42, to processor 43. Referring once again to FIG. 4a, logic block 418 represents the estimation, at processor 43, of position vector 302*(t) in coordinate system 12, based upon known position vectors 301(t) and 303(t) in coordinate system 12. The asterisk (*) represents an estimated value. The estimate is made using $$302^*(t) = 301(t) - 303(t) \tag{1}$$

It should be noted that 302*(t) is measured in coordinate system 12 of aircraft 10.

From block 418 of FIG. 4a, the logic flows to a further block 420, which represents the generation of a position vector $E^{302}$ representing the difference between the estimated value 302*(t) of position vector 302(t) as measured in coordinate system 12 and the measured value 302(t) as measured in coordinate system 10 using $$E302(t) = 302^*(t) - 302(t) \tag{2}$$

Figure 5:
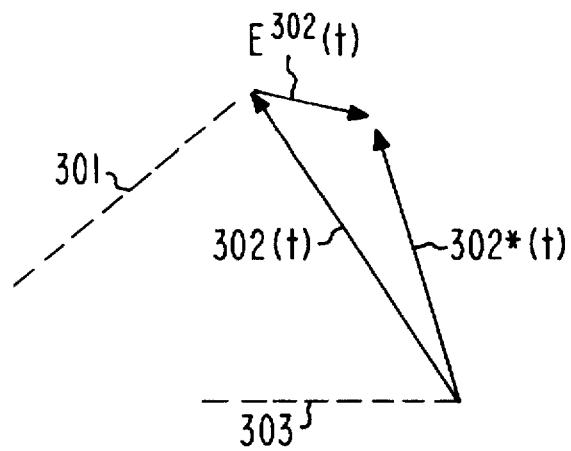
FIG. 5 is diagram of a portion of the plot of FIG. 3, illustrating how an estimated value in a first coordinate system may differ from a measured value in a second coordinate system, and showing a difference therebetween.

Referring to FIG. 5, difference vector E302(t) represents the differential displacement between vectors 302*(t) and 302(t) in coordinate systems. 12 and 10, respectively. Consequently, vector E302(t) represents the difference between a vector in a given coordinate system and the estimated value of that same vector in another coordinate system. Clearly, this is the difference between the coordinate systems themselves, to within the measurement accuracy. Thus, E302(t) of FIG. 5 represents the alignment difference between coordinate systems 12 and 22 of FIG. 1.

From block 420 of FIG. 4a, the logic flows to a further block 422, for generation of the partial measurement matrix M(t) which relates the difference vector E302(t) to the angular misalignment between estimated position vector 302*(t) and measured position vector 302(t). The partial measurement matrix M(t) is computed as the 3×3 matrix equivalent of the cross-product of vector 302(t) with E302 (t), by $$M = \begin{matrix} 0 & -R^{302}(z) & R^{302}(y) \\ R^{302}(z) & 0 & R^{302}(x) \\ -R^{302}(y) & -R^{302}(x) & 0 \end{matrix} \tag{3}$$

Figure 6:
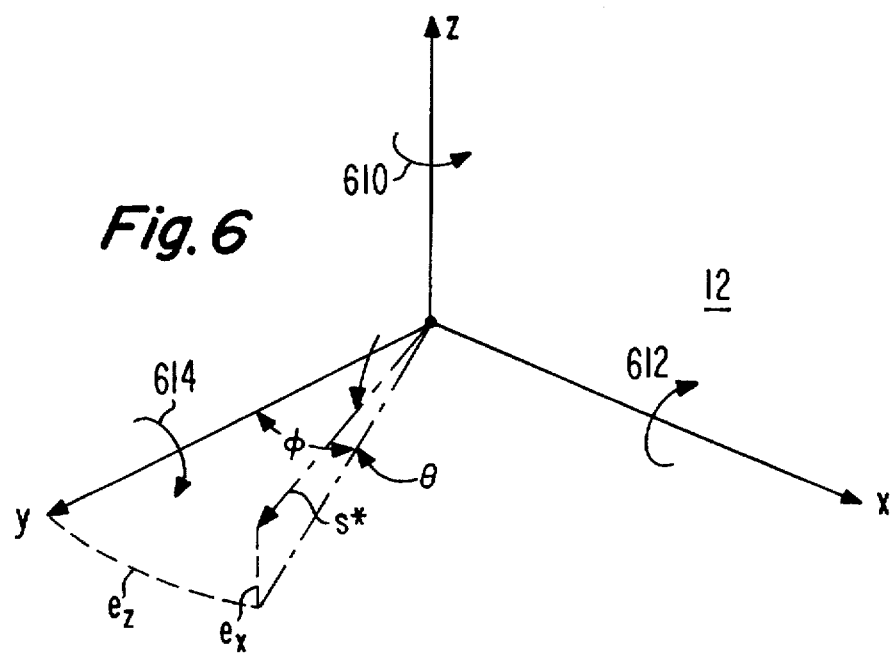
FIG. 6 is a representation of an x, y, z coordinate system, illustrating the components of the difference between an estimated value and a measured value.

As so far described, the estimation of the misalignment between the two coordinate systems can be explained with the aid of FIG. 6. In FIG. 6, the right-handed coordinate system 12 is represented by the x, y, and z axes (the -y axis is illustrated to maintain a right-handed coordinate system). Vector s* in FIG. 6 represents the estimation of coordinate vector s of coordinate system 22, as measured in coordinate system 12, rotated relative thereto. Coordinate vector s is selected in order to simplify the explanation. In FIG. 6, vector s is displaced by an angle Φ from the y-z plane, and by an angle θ from the x-y plane. Angle Φ corresponds to a first angular component $e_z$ of the coordinate misalignment vector C, and angle θ corresponds to a second angular component $e_x$ of the coordinate misalignment vector C.

More particularly, $e_z$ represents the rotation of vector s* about the z-axis in the direction of arrow 610, and $e_x$ represents the rotation of vector s* about the x-axis in the direction of arrow 612. The relative rotation of vector s* about the y-axis cannot be determined from the data available from the measurement of position vectors 301(t), 302(t) and 303(t) as so far described.

In order to fully characterize the angular displacement of coordinate system 22 relative to coordinate system 12 about all three axes, according to an aspect of the invention, a second measurement is made of the same position vectors 301, 302, and 303, at a later time (t+1). The time duration between (t) and (t+1) is preferably selected to be sufficiently great so that the motion of one of the r- or t-axes of coordinate system 22 rotates relative to the x- or z-axes, respectively, of coordinate system 12 by an amount great enough to obtain the desired measurement accuracy. These motions correspond to a rotation about the y-axis such as that suggested by arrow 614 of FIG. 6. Thus, a delay which provides simple parallel translation of the two coordinate systems 12 and 22 is insufficient to establish a relative rotation 614 about the y-axis, and there must be a relative rotation about x or z axes.

Figure 7:
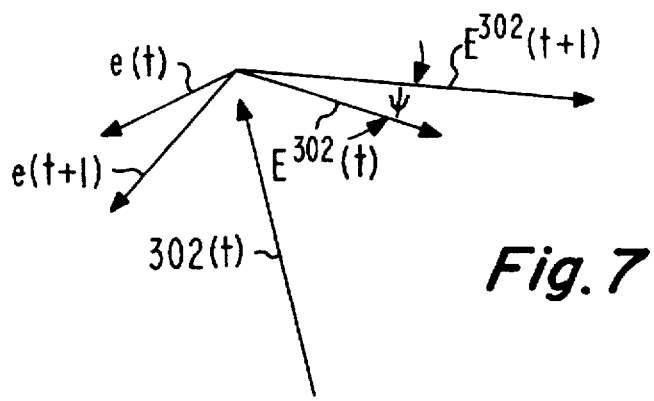
FIG. 7 illustrates error vectors resulting from two successive measurements.

According to a further aspect of the invention, a second measurement of position vectors 301, 302 and 303, as illustrated in FIG. 3, is made at time (t+1) later than time (t). These position vectors are designated 301(t+1), 302(t+1) and 303(t+1). Generally speaking, the position of vector 302*(t+1) in coordinate system 12 is estimated as described generally above, and subtracted from the measured value of 302(t+1) in coordinate system 22, to generate a second difference vector E302(t+1). After the second measurement is completed, and the two successive difference vectors E302(t) and E302(t+1) are generated, the two difference vectors may be further processed to determine the three-dimensional angular displacement between coordinate systems 12 and 22. FIG. 7 illustrates difference vectors E302(t) and E302(t+1). It should be noted that the coordinate systems 12 and 22 move relative to each other in the interval between measurements at time (t) and (t+1), and therefore the relative angular positioning of the two coordinate systems will always contain some residual error. Angle $\Psi$ of FIG. 7 is the rotational angle about the y-axis of FIG. 6.

The misalignment angles $\Phi$, $\Psi$, and, $\theta$ as measured in coordinate frame 12 are determined from the measurements made at time (t), or alternatively at time (t+1). In FIG. 4b, block 436 represents the multiplication of the inverse of the partial measurement matrix, M(t), by the difference vector, E302(t). The resulting product is the misalignment vector, C(t), as illustrated in FIG. 7. Vector C(t) as illustrated in FIG. 7 is orthogonal to difference vector E302(t) and also orthogonal to the measured vector 302(t). The elements of the vector C(t) represent the misalignment angles between coordinate systems 12 and 22.

In FIG. 4a, the logic proceeds from block 422 to a decision block 424, in which the number of available measurements is determined. If only one measurement, made at the current time (t), is available, the logic leaves decision block 424 by the NO output, and proceeds by a logic path 426 to a further block 428. Block 428 represents a time delay which allows for relative motion between aircraft 10 and aircraft 20 of FIG. 1. As mentioned above, the time delay between times (t) and (t+1) is preferably sufficiently large so that the coordinate relationships are determined with the desired accuracy. From time delay block 428, the logic proceeds by a logic path 430 to a logic block 434. Block 434 represents incrementing of the index (t) to (t+1).

The logic then returns to block 412 by logic path 436, and performs the same determinations as those described above in conjunction with blocks 412–422, where the hyphen represents the word "through"

After being initialized, the loop, as so far described in conjunction with FIG. 4a, loops byway of the NO output of decision block 424. At the second looping, and at all subsequent loops, the logic leaves decision block 424 by the YES output, because two measurements are available, namely those made at times (t) and (t+1). From the YES output of decision block 424, the logic loops back to delay block 428 by way of logic path 432 for yet another iteration, and, since two measurements are now available, also proceeds to block 436 OF FIG. 4b.

Block 436 of FIG. 4b represents formation of a 3×3 skew-symmetric matrix ~302*(t), illustrated in FIG. 8a, from the x,y and z components of estimated vector 302*(t). The ~ represents a skew symmetric matrix. The 3×3 matrix of FIG. 8a is skew symmetric because the off-diagonal components are negative-complementary. The skew-symmetric matrix of FIG. 8a is the matrix equivalent of the vector cross-product operation.

From block 436, the logic flows to block 438. Block 438 of FIG. 4b represents formation of a 3×3 skew-symmetric matrix ~302*(t+1), illustrated in FIG. 8b, form the x,y and z components of estimated vector 302*(t+1). The 3×3 matrix of FIG. 8b is skew symmetric because the off-diagonal components are negative-complementary. The skew-symmetric matrix of FIG. 8b is the matrix equivalent of the vector cross-product operation.

From block 438, the logic flows to block 440 of FIG. 4b, which represents formation of a 6 row, 3 column augmented matrix, 302*$^A$. The augmented matrix of FIG. 8c includes information relating to the coordinate transformation as determined by the two successive estimates. It should be noted, that if three successive measurements are available, the augmented matrix may have 9 rows, and 3 columns, and the number of rows increases by 3 with each additional measurement. Such additional measurements are advantageous in that improved coordinate transformation accuracy can be obtained. However, the example assumes only two measurements.

From block 440, the logic flows to block 442 of FIG. 4b, which represents formation of a 6 row, 1 column augmented measured vector 302$^U$. The augmented Vector of FIG. 8d includes information relating to the coordinate transformation as determined by the two successive measurements (as opposed to estimates). As mentioned above, if three successive measurements are available, the augmented vector may have 9 rows, and the number of rows increases by 3 with each additional measurement.

From block 442, the logic flows to a block 444 which represents generating the 3 row, 6 column, least-squares pseudo-inverse matrix 302*$^{PA}$ from matrix 302*$^A$ of FIG. 8c. In the equation of FIG. 8c, the matrix 302*$^{PA}$ is the product of the transpose of matrix 302*$^A$ multiplied by the inverse of a further matrix product. The further matrix product is itself the product of matrix 302*$^A$ multiplied by the transpose of matrix 302*$^A$.

From block 444, the logic flows to block 446 which represents determination of the 3 row, 1 column coordinate transformation vector C. Vector C, as illustrated in FIG. 8f, is the product of 3 row, 6 column pseudo-inverse matrix 302*$^{PA}$ multiplied by 6 row, 1 column vector 302$^U$.

From block 446, the logic flows to block 448 of FIG. 4b which represents formation of the coordinate transformation matrix [C] as illustrated in FIG. 9. Matrix [C] represents the coordinate transformation required to convert position measurements made in the [r s t] coordinate system into the [x y z] coordinate system as suggested by FIG. 9b. The converse transformation is accomplished by transposing the elements of matrix [C] to form [C]$^T$.

Once the transformation matrix [C] has been computed at the common location, which in the example is at location 41, it may be transmitted to remote locations which do not know the transformation. Thus, block 450 of FIG. 4b represents the transmission of at least [C] to aircraft 10 or 20 of FIG. 1. Consequently, each aircraft has precise information as to location of objects in each other's reference frames without the need for cumbersome calibration or alignment techniques. In effect, an alignment is performed at the moment the information is required by the computations based upon observed positional information of a common reference.

In a particular embodiment of the invention, aircraft 20 may be considered to be a rocket propelled missile controlled from aircraft 10. Tower 30 represents the target toward which missile 20 is directed.

As so far described, the time delay between measurements has been selected long enough so that the directly unmeasureable angle $\psi$ can be resolved with two time successive measurements. Under some conditions, the direction of motion of one of the vehicles may be controllable. In such a circumstance, the direction of motion can be selected to minimize the time interval between measurements which is required to uniquely resolve the nominally unmeasureable angle $\psi$. Reduction of the time interval is desirable because it allows more frequent information updates. For example, assuming that aircraft 20 can be controlled from common location 40 of FIG. 1, angle $\psi$ of FIG. 7 is the nominally unmeasureable angle, corresponding to rotation about the -y axis of FIG. 6. After the first measurement at time (t) is made, aircraft 20 is commanded to move in a direction perpendicular to the y axis of FIG. 6, which corresponds to the y axis of aircraft 10 of FIG. 1. By moving in the selected direction, the time required to generate a resolvable measurement is minimized.

Thus, an apparatus according to the invention determines the attitude of a first object (10) moving relative to a second (20) based upon first and second position measurements made at the objects. The apparatus includes a first object (10) having a first coordinate system (12) including mutually orthogonal x,y and z coordinate axes, and also includes a second object (20), remote from the first object (10), and which may be in compound motion relative thereto. The second object (20) has a second coordinate system (22) including mutually orthogonal r,s and t coordinate axes, which may not correspond rotationally with the first coordinate system (12). A signal generator (210) is coupled to the first (10) and second object (20), and to a reference object (30) remote from the first (10) and second object (20). The signal generator (210) generates, at a first instant of time (t1), first and second position signals representative of the position of the reference object (30) relative to the first and second object (20), respectively, and a third position signal representative of the position of the second object (20) relative to the first object (10). The signal generator (210) also generates at a second instant of time, fourth and fifth position signals representative of the position of the reference object (30) relative to the first and second object (20)s, respectively, and a sixth position signal representative of the position of the second object (20) relative to the first object (10). At the second instant of time, the second object (20) is at a different position relative to the first object (10) than at the first instant. The first, third, fourth and sixth position signals are measured in the first coordinate system (12), and the second and fifth position signals are measured in the second coordinate system (22). A processor is coupled to the signal generator (210) for estimating the position of the second object (20) relative to the reference object (30) based upon the first and third reference signals, and for comparing the estimate of the position of the second object (20) relative to the reference object (30) with the second position signal for generating first and second angles of a three-angle transformation matrix representative of the attitude of the second coordinate system (22) relative to the first coordinate system (12). The processor also estimates the third angle of the transformation matrix from the fourth, fifth, and sixth position signals. In one embodiment, the relative motions of the first and second object (20) may be controlled by signals based upon the application of the transformation matrix to the position signals measured at both of the objects.

Those skilled in the art will realize that the described method of solution as illustrated and described in conjunction with FIGS. 8a–8f and FIGS. 9a–9b represents an algebraic solution of static linear equations with two sets of data. A plurality of data sets over time allow solution by recursive methods known as dynamic linear estimation, least-squares estimation, or Kalman filtering.

Other embodiments of the invention will be apparent to those skilled in the art. For example, instead of a terrestrial object such as the illustrated tower, the reference object may be a stellar object, orbiting spacecraft, or other heavenly body. While the flowchart of FIG. 4a has been described as being performed by processor 43 of FIG. 1, the processing can be done anywhere, and more particularly may be performed at aircraft 10, or aircraft 20 or both; the only requirement being that the requisite information must be transmitted to the location where the processing is being performed. When more than two time sequential measurements are made, it may be desirable to weight the measurements, depending upon the noise characteristics of the system, so that, for example, greater emphasis is given to more recent measurements and less to older measurements. Similarly, it has been assumed that the measurements are made simultaneously at aircraft 10 and 20; it may be desirable to time-tag the measurements transmitted to the common location and to perform appropriate temporal interpolations.

What is claimed is:

1. An apparatus for determining the attitude of a relatively moving object from first and second position measurements made at itself and at another object, said apparatus comprising:

a first object having a first coordinate system including mutually orthogonal x,y and z coordinate axes;

a second object, remote from said first object, and which may be in compound motion relative thereto, said second object having a second coordinate system including mutually orthogonal r,s and t coordinate axes, which may not correspond with said first coordinate system;

a reference object displaced from both said first and second objects;

signal generating means coupled to said first, second, and reference objects for generating, first and second position signals representative of the position of said reference object relative to said first and second objects, respectively, and a third position signal representative of the position of said second object relative to said first object at a first instant of time, and for generating fourth and fifth position signals representative of the position of said reference object relative to said first and second objects, respectively, at a second instant of time at which said second object is at a different position relative to said first object than at said first instant, and a sixth position signal representative of the position of said second object relative to said first object, said first, third, fourth and sixth position signals being measured in said first coordinate system, and said second and fifth position signals being measured in said second coordinate system, and;

processing means coupled to said signal generating means for estimating the position of said second object relative to said reference object based upon said first and third reference signals, and for comparing said estimate of said position of said second object relative to said reference object with said second position signal for generating first and second angles of a three-angle transformation matrix representative of the attitude of said second coordinate system relative to said first coordinate system, and for estimating said third angle of said transformation matrix from said fourth, fifth, and sixth position signals.

2. A method for directing a first vehicle from a second vehicle, where the coordinate systems of the two vehicles are relatively skewed, said method comprising the steps of:

measuring the direction and range of a reference object from said first and second vehicles, to produce first and second signals, respectively, representing the direction and range of said reference object in first and second coordinate systems associated with said first and second vehicles, respectively;

measuring the direction and range of said first vehicle from said second vehicle, to generate third signals representing the range and position of said first vehicle in said second coordinate system;

transmitting said first signals from said first vehicle to said second vehicle;

at said second vehicle, estimating said direction and range from said first vehicle to said reference object based upon said first and second measurements made in said second coordinate system, to produce estimated first signals;

at said second vehicle, determining two of three components of a coordinate transformation between said first and second coordinate systems from said first signal and said estimated first signal;

repeating said steps of (a) measuring the direction and range of a reference object from said first and second vehicles, (b) measuring the direction and range of said first vehicle from said second vehicle, (c) measuring the direction and range of said first vehicle from said second vehicle, (d) transmitting said first signals from said first vehicle to said second vehicle, and (e) estimating said direction and range from said first vehicle to said reference object based upon said first and second measurements made in said second coordinate system, to form later measurements;

at said second vehicle, determining from the combination of said first signals, estimated first signals, and said later measurements, the third component component of said coordinate transformation.

3. A method according to claim 2 further comprising the step of:

before said step of repeating said steps of (a), (b), (c), (d) and (e), directing said first vehicle in a direction orthogonal to an axis of said second coordinate system.

* * * * *